Patented Aug. 4, 1953

2,647,929

UNITED STATES PATENT OFFICE 2,647,929

SEPARATION OF THE DIASTEREOISOMERIC BIS[β - (ORTHO - METHOXYPHENYL) ISOPROPYL]AMINES

Richard V. Heinzelmann, Kalamazoo, Mich., assignor to The Upjohn Company, Kalamazoo, Mich., a corporation of Michigan No Drawing. Application April 26, 1951,
Serial No. 223,147

6 Claims. (Cl. 260—570.8)

This invention relates to the diastereoisomeric bis[β - (ortho - methoxyphenyl) isopropyl]amines represented by the formula:

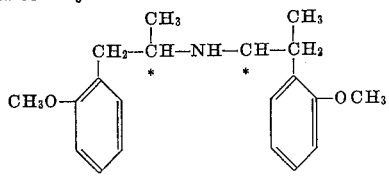

their salts with acids and to their preparation.

The amines of this invention are basic mobile liquids which form salts equally well with organic and inorganic acids such as sulfuric, hydrochloric, nitric, lactic, glycolic, acetylsalicylic, nicotinic, acetic and like acids. Due to the presence in the amine molecule of two identical asymmetric carbon atoms, indicated by the asterisks in the structural formula presented above, a racemic and a meso modification exist (Gilman, Organic Chemistry, 2nd edition, John Wiley and Sons Inc., New York, vol. I, pages 232 and 233). Both of these diastereoisomeric modifications form salts with acids as mentioned above, with the melting point and solubilities of any specific salt of one modification differing considerably from the melting point and solubilities of the same salt of the other diastereoisomer.

The products of this invention are useful in therapy, as anesthetics, bronchodilators, antispasmodic and antisecretory agents, differing from previously known amines in their wide range of activities as well as their potency. They are particularly useful in anesthesia not only because of their effectiveness and favorable therapeutic ratio but because in addition to these properties they are so stable that their aqueous solutions can be sterilized by heating without any resultant hydrolysis. In this respect they differ substantially from those anesthetics which are esters or halogenated compounds.

The diastereoisomeric amines of this invention can be prepared, but not necessarily in equal amounts by contacting a solution of ortho-methoxyphenylacetone and either ammonia or ortho-methoxyphenylisopropyl amine in a suitable solvent with hydrogen in the presence of a hydrogenation catalyst under suitable conditions of temperature and pressure until the absorption of hydrogen, as shown by the drop in hydrogen pressure, has stopped. The catalyst and solvent are then removed and the residual oil fractionally distilled under reduced pressure; the portion distilling at about 200 degree centigrade at a pressure of about three millimeters of mercury being a mixture of the two diastereoisomeric bis[β-(ortho-methoxyphenyl) isopropyl]amines.

The temperature and hydrogen pressure used is dependent in part upon the particular hydrogenation catalyst employed. Most common hydrogenation catalysts can be used such as Raney nickel, platinum oxide, palladium and copper chromite catalysts with platinum oxide or Raney nickel being preferred. Temperatures of between about 25 to about 35 degrees centigrade and hydrogen pressures of between 45 to about 60 pounds per square inch are preferred although higher or lower temperatures and pressures can be employed. Suitable solvents includes those which are neutral and resist hydrogenation under the reaction conditions employed such as esters, lower alcohols, hydrocarbons and the like with methanol being a preferred solvent. It is preferred to use a slight excess of ammonia over the calculated quantity necessary to convert ortho-methoxyphenylacetone to bis[β-(ortho-methoxyphenyl) isopropyl]amine but a large excess of ammonia is to be avoided as when it is used ortho-methoxyphenylisopropyl amine is the predominating reaction product. On the other hand ortho-methoxyphenylacetone and ortho-methoxyphenylisopropyl amine are preferably mixed in equimolecular proportions.

Mixtures of the diastereoisomeric amines of this invention can be separated into pure individual isomers by converting a mixture containing both isomers to a suitable salt and fractionally crystallizing the salts from a suitable solvent such as water or isopropanol, according to known methods until pure isomer-free products are obtained. However this procedure is not particularly satisfactory in the present instance unless only a small proportion of the contaminating isomer is present. A preferred procedure is based on the unexpected discovery that one of the diastereoisomers forms a complex with many alcohols which is relatively insoluble in an excess of the alcohol, particularly at temperatures below room temperatures, while the complex with the other isomer, if it is formed, is much more soluble and does not crystallize when an excess of the alcohol is present. Among the alcohols which can be used in this method for the separation of the isomeric amines of this invention are methanol, ethanol, propanol, isopropanol, ethylene glycol, propylene glycol, cyclohexanol and diethylene glycol mono ethyl ether (Carbitol). In carrying out the separation of the isomeric amines by this method a mixture of the isomeric amines is dissolved in a warm alcohol, for example methanol, and the solution cooled to below room temperature. The solid complex which is formed between one of the isomers precipitates from the solution and is collected by filtration or like procedure. This solid complex remains a solid only so long as it is damp with the alcohol used, removal of the alcohol as by exposure to air or heating causes liquefication, the solvent free liquid amine being obtained. The mother liquor remaining after removal of the solid upon concentration and cooling will often deposit a second crop of the crystalline complex which can be collected and combined with the first crop. Complete removal of the solvent yields the other diastereoisomer in purified condition. By this procedure a sufficiently complete separation of the two isomers is obtained so that further purification, when necessary, can be accomplished readily and without much loss of material by forming a suitable salt of the amine and crystallizing the salt from water, isopropanol or other solvent as previously mentioned.

The following examples, which illustrate the products and process of this invention, are subject to variations as will be apparent to those skilled in the art to which this invention pertains.

*Example 1.—Preparation from ortho-methoxyphenylacetone and ortho-methoxyphenylisopropylamine*

A solution of 82.5 grams (0.5 mole) of ortho-methoxyphenylisopropyl amine and 82.0 grams (0.5 mole) of ortho-methoxyphenylacetone in 200 milliliters of absolute methanol was hydrogenated in a Parr hydrogenation apparatus at room temperature under a hydrogen pressure of 45 p. s. i. using 0.5 gram of Adams' platinum oxide catalyst until hydrogenation was complete, which required about five hours. The reaction mixture was warmed and the catalyst removed by filtration and the methanol removed by distillation. Upon fractional distillation of the residual oil there was obtained 116 grams of a mixture of the meso and racemic modifications of bis[β-(ortho-methoxyphenyl)isopropyl]amine distilling at about 200 degrees centigrade at a pressure of 3.0 millimeters of mercury, which had an index of refraction $N_D^{20}$ of 1.5500.

The meso and racemic modifications were separated by means of the methanol complex.

*Example 2.—Preparation from ortho-methoxyphenylacetone and ammonia*

A solution of 492 grams (3.0 moles) of ortho-methoxyphenylacetone and 28 grams (1.65 mole) of ammonia in 900 milliliters of methanol was placed in an autoclave and hydrogenated at room temperature under a hydrogen pressure of about 50 p. s. i. using 3.0 grams of platinum oxide catalyst until absorption of hydrogen had ceased, which required about 10 hours. The reaction mixture was warmed and the catalyst was removed by filtration. This methanol solution containing the racemic and meso bis[β-(ortho-methoxyphenyl)-isopropyl]amines was used below for separation into the pure racemic and meso forms.

*Example 3.—Isolation of the isomer forming an insoluble methanol complex and salts thereof*

The filtrate obtained in Example 2 after removal of the catalyst was evaporated to a volume of about one liter and cooled to about five degrees centigrade for about sixteen hours. The solid, crystalline material which had separated was removed by filtration and so long as it was damp with methanol it remained solid. (When a portion was allowed to stand exposed to air the methanol evaporated and the solid changed to liquid.) The filtrate thus obtained was saved and further treated as described in Example 4.

The solid methanol complex, obtained above, was dissolved in ether and to the solution ice and water were added. A ten percent solution of hydrochloric acid in water was added portionwise, with vigorous stirring, to the mixture until it was acid to Congo red test paper. The resulting amine hydrochloride separated as a solid precipitate which was collected, washed with ice water and dried. There was thus obtained 185 grams of a bis[β-(ortho-methoxyphenyl)isopropyl]amine hydrochloride which melted at 244.5 to 245.0 degrees centigrade. Several crystallizations from isopropanol raised the melting point to 254–255 degrees centigrade.

Analysis:
Calc'd for $C_{20}H_{28}ClNO_2$_____ C, 68.65; H, 8.06; Cl, 10.13; N, 4.00
Found_____ C, 68.68; H, 7.90; Cl, 9.83; N, 4.25

A portion of the above amine hydrochloride was suspended in water and converted to the free amine by the addition, with stirring of sodium hydroxide solution. The amine was extracted with benzene, the solution washed with water and the benzene removed by distillation. The residual water-free amine was dissolved in two parts of isopropanol and to this solution was added a slight excess of 85 percent lactic acid dissolved in two parts of isopropanol. The mixture, which became warm due to the heat of neutralization, was cooled and the bis[β-(ortho-methoxyphenyl)isopropyl]amine lactate which precipitated was collected and after crystallization from isopropanol melted at 156.5–157 degrees centigrade. At about 25 degrees centigrade this lactate is soluble in water to the extent of about 1.75 percent.

Analysis:
Calc'd for $C_{23}H_{33}NO_5$_____ C, 68.46; H, 8.24; N, 3.47
Found_____ C, 68.51; H, 8.21; N, 3.67

In a like manner the amine hydrochloride above was converted to the free amine from which the following salts were prepared by means of an isopropanol solution of the appropriate acid.

| Salt | Melting Point, degrees centigrade | Water Solubility, percent |
|---|---|---|
| Nicotinate | 156–158 | 0.48 |
| Nitrate | 168–169 | 0.08 |
| Acetylsalicylate | 110–111 | 0.25 |
| Glycolate | 166.5–167 | 1.44 |

*Example 4.—Isolation and purification of the methanol soluble isomer and salts thereof*

The filtrate obtained in Example 3 after separation of the methanol insoluble amine complex was concentrated to give 280 grams of an oil which was fractionally distilled under a pressure of 0.1 millimeter of mercury. The first fraction which distilled at 93–110 degrees centigrade weighed 85 grams and had an index of refraction of $N_D^{20}$ of 1.5313 and consisted in part of a mixture of unreacted ortho-methoxyphenylacetone and some ortho-methoxyphenylisopropyl amine. The second fraction distilling at 194–196 degrees weighed 171 grams and had an index of refraction $N_D^{20}$ of 1.5510. This fraction, which still contains some of the isomer of Example 3, was dissolved in 500 milliliters of 80 percent aqueous methanol and cooled, a further quantity of insoluble methanol complex separating which after filtering off weighed 29 grams while still damp with methanol.

The methanol and most of the water were removed from the filtrate and the residual oil dried by adding benzene to it and distilling off the benzene. The dry amine thus obtained was dissolved in ether and to it was added ethereal hydrogen chloride until the entire solution was slightly acid. Crystals of amine hydrochloride separated and after cooling the mixture to insure complete precipitation the solid amine hydrochloride was collected, washed with ether and after drying weighed 137 grams. This solid hydrochloride was suspended in three liters of boiling isopropanol and filtered from the undissolved material while hot, which removed 26 grams of the amine hydrochloride of Example 3 melting at 243–246 degrees centigrade. The filtrate was cooled somewhat, two liters of ether were added and the solution cooled to about ten degrees centigrade. The crystalline hydrochloride which separated was collected and after drying weighed 103 grams and melted at 199.5–204 degrees centigrade. A portion of this material was again extracted with boiling isopropanol and after the addition of ether a bis[β-(ortho-methoxyphenyl)isopropyl]amine hydrochloride melting at 202.5–205 degrees centigrade was obtained.

Analysis:
Calc'd for $C_{20}H_{28}ClNO_2$ ------------------------------ Cl, 10.13
Found ------------------------------------------------------- Cl, 10.01
                                                                 10.26

A hydrochloride having an improved purity was obtained by dissolving the lactate (prepared below) in water and adding sodium chloride to the solution. The bis[β-(ortho-methoxyphenyl)isopropyl]amine hydrochloride thus obtained melted at 214–215 degrees centigrade. It was soluble in water to the extent of about 0.5 percent.

Analysis:
Calc'd for $C_{20}H_{28}ClNO_2$ -------------- C, 68.65; H, 8.06; N, 4.00
Found ----------------------------------- C, 68.46; H, 8.00; N, 3.97

The remainder of the amine hydrochloride above melting at 199.5–204 degrees centigrade was suspended in water and converted to the free amine by the addition, with stirring, of sodium hydroxide solution. The amine was extracted with benzene and the benzene removed by distillation. The dry amine thus obtained was dissolved in anhydrous ether and to this solution was added dropwise with stirring a solution of the calculated amount of lactic acid in ether (prepared by dissolving 85 percent lactic acid in ether, drying the solution with magnesium sulfate and filtering). The amine lactate crystallized slowly so the solution was cooled to five degrees centigrade for two days to insure complete precipitation. The precipitate of bis[β-(ortho-methoxyphenyl)isopropyl]amine lactate was collected and after drying weighed 90 grams and melted at 139–141.5 degrees centigrade. Crystallization from either isopropanol-ether or methyl ethyl ether ketone raised the melting point to 140.5–142 degrees centigrade.

Analysis:
Calc'd for $C_{23}H_{33}O_5N$ ------------------ C, 68.46; H, 8.24; N, 3.47
Found ----------------------------------- C, 68.35; H, 8.40; N, 3.45

This lactate is soluble in water in the amount of about five percent. When converted to the hydrochloride by the addition of NaCl to its aqueous solution a hydrochloride melting at 214–215 degrees centigrade was obtained. The free base obtained from the lactate had a density at 27 degrees centigrade of 1.0234 and an index of refraction $N_D^{20}$ of 1.5490.

*Example 5.—Preparation of insoluble alcohol complexes*

The amine hydrochloride melting at 254–255 degrees centigrade, described in Example 3, was converted to the free base by adding the hydrochloride to a solution of sodium hydroxide in water. The amine was extracted with benzene, the benzene solution washed with water and the solvent removed by distillation. One part of the amine thus obtained was added to five parts of the selected alcohol and the solution cooled with the results as shown in the following table:

TABLE

| Alcohol | Solubility |
|---|---|
| 1. Methanol | Crystals at once at 25° C. Relatively insoluble in excess alcohol. |
| 2. Ethanol | Same as methanol. |
| 3. n-Propanol | Do. |
| 4. iso-Propanol | Do. |
| 5. n-Butanol | Do. |
| 6. tertiary Butanol | Solution clear at 25° C. Crystalline precipitate probably alcohol at zero. |
| 7. iso-Amyl alcohol | Solution clear at 25° C. Crystalline precipitate at 5° C. |
| 8. sec. Amyl alcohol | Same as iso-amyl alcohol. |
| 9. Methyl Cellosolve | Do. |
| 10. tert. Amyl alcohol | No crystals at 5° C. |
| 11. Butyl Cellosolve | Do. |
| 12. Pyrrolidine ethanol | No crystals. |
| 13. Ethylene glycol | Same as methanol. |
| 14. Propylene glycol | Do. |
| 15. Cyclohexanol | Do. |
| 16. Carbitol | Do. |

*Example 6.—Alcohol soluble complex*

One part of the free amine obtained in Example 4 was dissolved in one part of the designated alcohol at room temperature and the solution cooled to five degrees centigrade with the results indicated in the following table:

TABLE

| Alcohol | Solubility |
|---|---|
| 1. Methanol | Crystals at 5° C. dissolved on addition of 4 parts of alcohol. |
| 2. Ethanol | Same as methanol. |
| 3. Cyclohexanol | Do. |
| 4. n-Propanol | Do. |
| 5. iso-Propanol | Do. |
| 6. n-Butanol | Do. |
| 7. Ethylene glycol | Do. |
| 8. Propylene glycol | Do. |
| 9. iso-Amyl alcohol | No precipitate. |
| 10. sec. Amyl alcohol | Do. |
| 11. Methyl Cellosolve | Do. |
| 12. Butyl Cellosolve | Do. |

Attention is called to application Serial No. 281,219, filed April 8, 1952, which is a continuation-in-part of this application, wherein subject matter is claimed which is disclosed but not now claimed in this application.

Having thus described my invention I claim:

1. A method for the separation of the diastereoisometric bis[β-(ortho-methoxyphenyl)isopropyl]amines comprising dissolving a mixture of diastereoisomeric amines in an alcohol and cooling the solution whereby a solid alcohol complex of one of the isomers is formed which precipitates, removing the solid alcohol-amine complex from the solution and isolating the other isomer from the solvent.

2. The method of claim 1 wherein the alcohol used is methanol.

3. The method of claim 1 wherein the alcohol used is ethanol.

4. The method of claim 1 wherein the alcohol used is n-propanol.

5. The method of claim 1 wherein the alcohol used is isopropanol.

6. The method of claim 1 wherein the alcohol used is cyclohexanol.

RICHARD V. HEINZELMANN.

References Cited in the file of this patent

UNITED STATES PATENTS

| Number | Name | Date |
|---|---|---|
| 2,006,114 | Rosenmund et al. | June 25, 1935 |
| 2,276,619 | Kulz | Mar. 17, 1942 |